United States Patent [19]

Gee

[11] 4,364,982

[45] Dec. 21, 1982

[54] GASKETS

[75] Inventor: Colin Gee, Mirfield, England

[73] Assignee: Flexitallic Gaskets Limited, Yorkshire, England

[21] Appl. No.: 213,492

[22] Filed: Dec. 5, 1980

[30] Foreign Application Priority Data

Dec. 15, 1979 [GB] United Kingdom ............... 7943295

[51] Int. Cl.³ ...................... F16J 15/00; F16L 21/04; F16J 9/04
[52] U.S. Cl. ..................................... 428/65; 277/124; 277/203; 277/204; 277/227; 277/229; 277/235 R; 428/174; 428/192; 428/422

[58] Field of Search ................. 428/65, 192, 422, 174; 277/124, 203, 204, 227, 229, 235 R; 285/363; 113/80 R

[56] References Cited

U.S. PATENT DOCUMENTS

| 3,117,795 | 1/1964 | Price | 277/204 |
| 3,573,873 | 4/1971 | Pearson | 277/203 |
| 3,729,205 | 4/1973 | Kwok | 277/229 |

Primary Examiner—Paul J. Thibodeau
Attorney, Agent, or Firm—Cushman, Darby & Cushman

[57] ABSTRACT

A spiral wound gasket is provided with an inner supporting ring coated with an elastomer material; it is preferably also provided with a plain metal outer guide ring.

6 Claims, 1 Drawing Figure

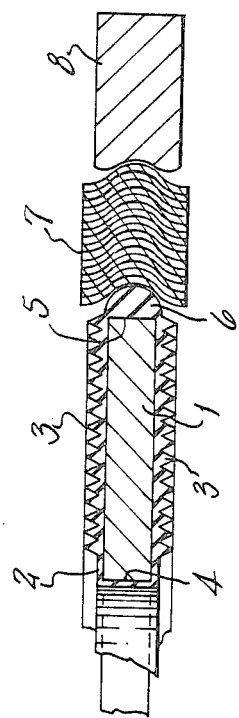

GASKETS

This invention relates to spiral wound gaskets. Such gaskets are well-known; they include a spiral winding of a resilient supporting material (usually a profiled metal strip), with a strip of a sealing material interspersed between the windings. In essence, this forms a laminated structure which is resilient in a direction perpendicular to the plane of the spiral and which can be clamped between pipe flanges to form a seal therebetween. However, in order to prevent over-compression of the spiral, it is normal practice to provide plain metal inner and outer supporting rings; the outer ring is usually referred to as a guide ring because it also has a locating function, as well as limiting the maximum compression of the spiral wound sealing element.

The inner and outer rings are flat annuli of metal of a thickness less that of the spiral, measured normal to the plane of the winding. They have no sealing function, because that is the task of the spiral wound gasket and accordingly in normal circumstances it does not matter if there is leakage past an inner ring. However, where an aggressive fluid is involved there may be a risk of corrosion of the spiral wound gasket and/or the pipe flanges. In such cases, the pipe itself may be lined with material such as an epoxy or other resin to protect the bore from attack. The lining will normally also extend at least part way onto the flanges, but this will not protect the inner ring and/or spiral and it is not always an economic proposition to make one or both from a corrosion-proof material.

According to the present invention, a spiral wound gasket has an inner ring coated with an elastomer material.

Preferably, the elastomer material on at least one of the flat faces of the ring incorporates a sealing profile, for example, in the form of a series of concentric ridges of V-shaped section with the apex of the V projecting away from the plane of the ring. In this preferred configuration, the inner ring resembles the traditional serrated gasket machined from solid metal, but its mode of use is entirely different, because the profiled elastomer faces do not cut into the flanges to be joined. The use of a profiled surface also allows for some displacement of elastomer material on compression. Preferably, the spiral wound gasket also has a plain metal outer guide ring of the usual kind.

It has been found that the use of an elastomer coated inner ring according to the invention can provide a primary seal effective to minimize the risk of leakage through to the spiral wound main seal. It also serves to protect the pipe lining material, if any, from mechanical damage, where it extends onto the pipe flanges. In particular the action of bolting-up the joint does not tend to crack an epoxy or other resinuous lining in the way that a conventional inner ring does.

Such an inner ring is also disclosed in our copending application of even date, but in the particular context of a low pressure joint for which the use of a spiral wound gasket would be wholly inappropriate.

However, in the present context, it is equally valuable in a high pressure joint where a spiral with its outer guide ring is essential to achieve a satisfactory secondary, or back-up seal and where it does not matter if the spiral cuts into the pipe flange coating (if any), because the elastomer coated inner ring serves to protect the vulnerable part of the coated flange from mechanical damage.

It will be appreciated that it is not simply a matter of coating a standard metal inner ring with elastomer. It is necessary to allow for the thickness of the elastomer material by making the inner ring thinner than usual. However, it may not be necessary to machine the radially-outer most edge of the inner ring to engage the inner circumference of the spiral wound gasket. The appropriate edge profile can be supplied by moulding it in situ from the elastomer material so that the inner ring will be retained in the spiral in the usual way.

Because the core portion of the inner ring is effectively encapsulated, it is not necessary to make it from an expensive metal or alloy and indeed, it is not even essential to make it from metal, provided it has sufficient hardness and rigidity of course. It may therefore be siginficantly cheaper than a conventional inner ring, particularly one formed, say, wholly from a fluoroelastomer material or from an expensive alloy. Similarly, its use may well obviate any need for the spiral wound gasket to incorporate ususually expensive materials, despite being used in an unusually aggressive enviroment. For many applications, the elastomer material can be a chemically-resistant rubber such as neoprene, although it may occasionally be necessary to use of fluoroelastomer. Even if it is necessary to do this only the inner ring will be affected of course; the cost of the spiral wound component and outer guide ring will not be altered.

In order that the invention be better understood, one embodiment of it will now be described by way of example with reference to the accompanying drawing in which the sole FIGURE is a cross-sectional side view through a spiral wound gasket in accordance with the invention.

In the FIGURE, a plain steel annulus 1 is encapsulated in neoprene rubber 2. The opposed flat faces of the rubber are profiled during encapsulation to incorporate a series of V-shaped ribs 3. The inner edge 4 has a substantially uniform coating of rubber on it; in use it forms the bore of the pipe joint, of course. The outer edge 5 has a moulded rubber "nose" 6, which is shaped to engage a corresponding recess in the inner surface of the associated, conventional spiral wound gasket, 7 and outer guide ring 8. The moulded nose could equally well be formed by machining the annulus 1 before applying the rubber.

Because the rubber ribs 3 can be displaced sideways into the associated grooves, the opposed faces of the annulus are relatively soft and even when bolted up between two pipe flanges, there is little or no risk of any protective coating on the flanges being damaged. This is particularly valuable where the flanges (and pipe bore) are coated with a chemically-resistant material such as an epoxy resin. The rubber deforms to make a seal against the resin layer, without cutting into it and exposing the pipe metal to possible corrosion by the fluid in the pipe. The seal also protects the spiral wound gasket and the steel annulus 1 at the same time, but of course the spiral forms the main seal and its outer guide ring serves to make the whole assembly both strong and rigid.

I claim:

1. In a spiral wound gasket the improvement comprising the provision of an inner ring coated with an elastomer material, said inner ring lying radially inwardly of and coplanar with said gasket, said inner ring being in the form of an annulus having two opposed substantially flat faces as the major faces of said annulus, and on at least one of said major faces the elastomer material is formed into a sealing profile.

2. The spiral wound gasket of claim 1 wherein said sealing profile is constituted by a series of concentric ridges of V shaped cross-section.

3. The spiral wound gasket of claim 1 or 2, wherein the radially-outermost edge of said inner ring is shaped to engage the inner circumference of the associated spiral wound gasket, whereby said ring is retained in coplanar relation to said gasket.

4. The spiral wound gasket of claim 3 wherein said shaping is constituted by an edge portion integrally moulded from said elastomer material.

5. The spiral wound gasket of claim 3 wherein said shaping is provided by profiling the edge of the inner ring prior to applying a substantially uniform coating of elastomer material thereto.

6. In a spiral wound gasket, the improvement comprising an inner ring having two opposed substantially flat faces as the major faces thereto, the entire inner ring coated with an elastomer material, said inner ring shaped to engage the inner circumference of the associated spiral wound gasket such that the inner ring lies radially inwardly of and coplanar with said gasket.

* * * * *